United States Patent [19]
Cavallerano et al.

[11] Patent Number: 5,751,264
[45] Date of Patent: May 12, 1998

[54] DISTRIBUTED DUTY-CYCLE OPERATION OF DIGITAL LIGHT-MODULATORS

[75] Inventors: Alan Cavallerano, Ossining; Claudio Ciacci, White Plains, both of N.Y.

[73] Assignee: Philips Electronics North America Corporation, New York, N.Y.

[21] Appl. No.: 495,290

[22] Filed: Jun. 27, 1995

[51] Int. Cl.$^6$ .............................. G09G 3/34; G09G 3/36; G09G 5/10

[52] U.S. Cl. ........................ 345/85; 345/89; 345/148

[58] Field of Search ................... 345/63, 77, 85, 345/89, 147, 148; 348/771

[56] References Cited

U.S. PATENT DOCUMENTS

| | | | |
|---|---|---|---|
| 5,068,649 | 11/1991 | Garrett | 340/793 |
| 5,079,544 | 1/1992 | DeMond et al. | 340/701 |
| 5,619,228 | 4/1997 | Doherty | 345/148 |

FOREIGN PATENT DOCUMENTS

WO 9409473  1/1994  WIPO ............... G09G 3/34

OTHER PUBLICATIONS

Larry J. Hornbeck, "Deformable–Mirror Spatial Light Modulators" /SPIE Critical Reviews Series vol. 1150 (1990), pp. 86–102.

R. Mark Boysel, "A 128 x 128 Frame–Addressed Deformable Mirror Spatial Light Modulator", Optical Engineering, Sep. 1991, vol.30, No. 9, pp. 1422–1427.

William F. Schreiber, "Fundamentals of Electronic Imaging Systems Some Aspects of Image Processing", pp. 100–103, Springer–Verlag.

*Primary Examiner*—Jeffery Brier
*Attorney, Agent, or Firm*—Robert J. Kraus

[57] ABSTRACT

In a matrix display of light reflecting elements, each element is duty cycle modulated into one of two states represented by successive bits of a digital display code to produce a luminance level represented by the code. In order to correct a visual artifact which occurs when the human eye views the element during only part of the modulation cycle for the code, the element is repeatedly sequentially activated for short periods into optical states represented by the most significant bits of the code.

18 Claims, 5 Drawing Sheets

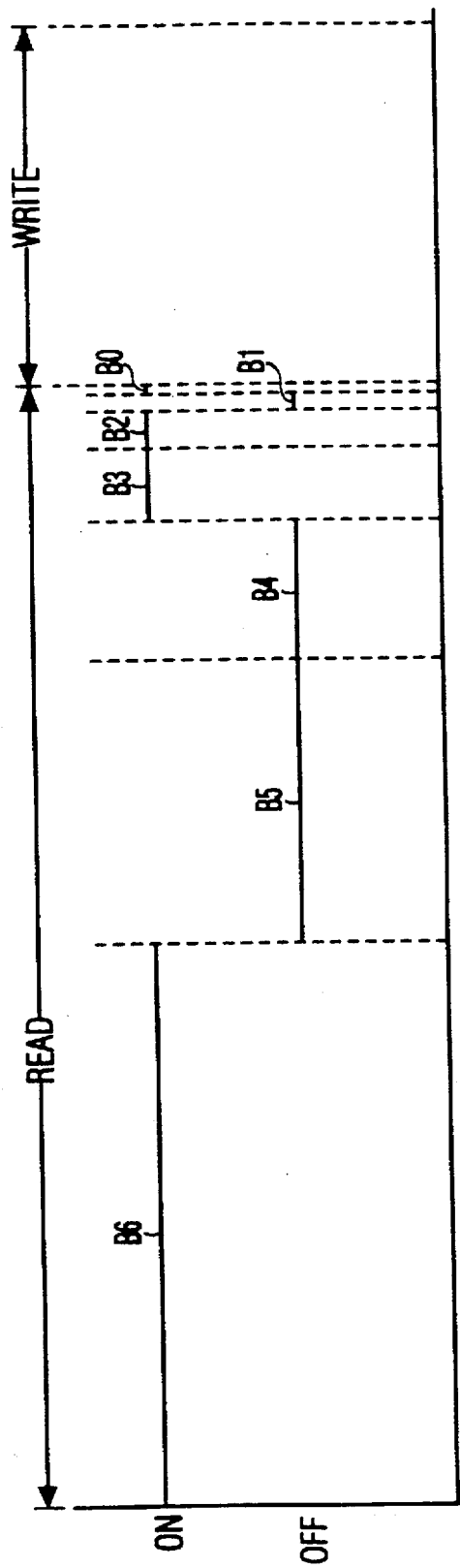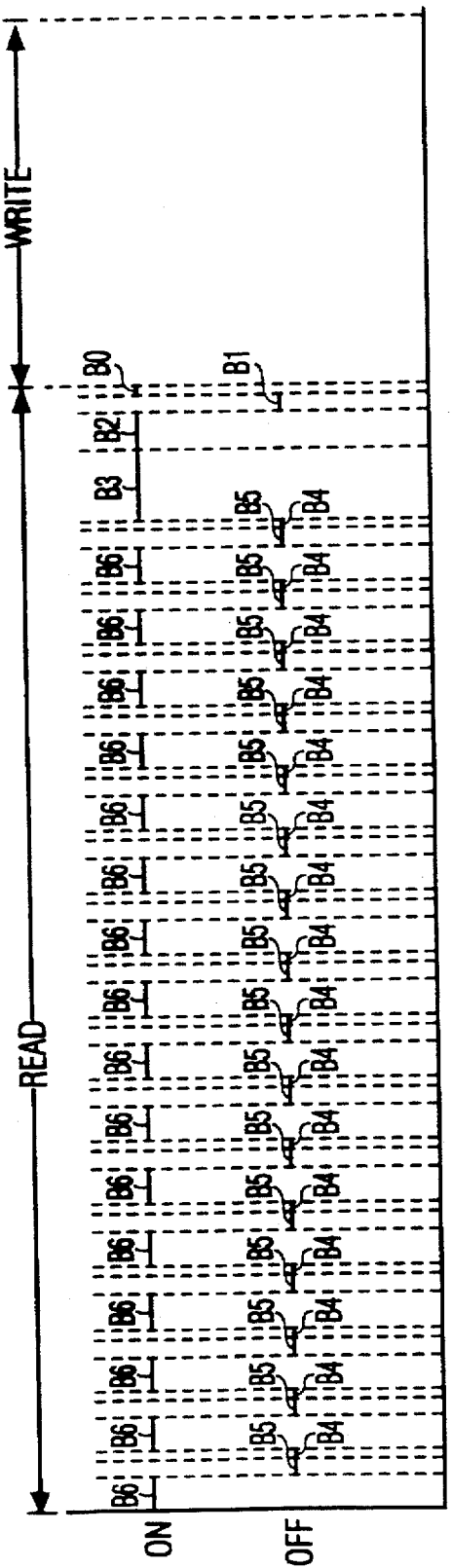

DISTRIBUTED DUTY-CYCLE OPERATION OF DIGITAL LIGHT-MODULATORS

BACKGROUND OF THE INVENTION

1. Field of the Invention

The invention relates to the utilization of an array of digital light modulating elements to display an image.

2. Description of Related Art

A digital light modulating element is one which is capable of modulating incident light to two different luminance levels. In the simplest case, either a bright or a dark light level would be produced. Typically the element is either light reflective or light transmissive. An advantage of this type of element is that it enables a display apparatus to be constructed which can be operated totally by the application of digital signals. This facilitates integration of the display and of associated digital drive circuitry on a chip.

Examples of devices having light modulating elements of this type are the well known liquid crystal device (LCD) and the less well known deformable-mirror spatial light modulator. A particular type of the spatial light modulator is the deformable-mirror device (DMD), which is described by Larry J. Hornbeck in "Deformable-Mirror Spatial Light Modulators", SPIE, Vol. 1150, pages 86–102 (1990), which is hereby incorporated by reference. The DMD incorporates, on an integrated circuit chip, a matrix array of individually-addressable, electrostatically-deflectable mirrors. Each mirror produces one light-modulated pixel of an image (e.g. figures, symbols or text) to be presented to a viewer.

U.S. Pat. No. 5,079,544, which is hereby incorporated by reference, describes in detail various display apparatus which utilize DMDs as digital light modulating elements. Three of the drawing figures from that patent are included herein, in slightly modified form as FIGS. 1, 2 and 3, to facilitate a general explanation of the operation of an exemplary DMD.

FIG. 1 is a diagram of a typical DMD integrated circuit chip including a timing circuit 14, an array 16 of deformable mirror cells, a register 18 (e.g. a shift register), and first and second decoders 22 and 24, respectively. The deformable mirror cells may be disposed in a matrix arrangement or in some other convenient arrangement. A typical arrangement is a row-and-column matrix where each cell is disposed at a crossing of a respective row and column conductor or line. This type of arrangement is presumed for purposes of describing and explaining the operation of the array 16. A memory cell, including a plurality of sub-cells for storing respective bits of a multi-bit display code, is associated with each mirror cell.

The register 18 has a number of taps 20 for electrical connection to a bus (not shown) to enable data to be loaded into the register for transfer to respective memory cells in the array. The bus may provide data from a variety of different sources, such as an A/D converter driven by a video source (e.g. a television), a computer or a graphics system. The register 18 also has a number of outputs which are connected to respective column lines $C_1, C_2 \ldots C_N$ of the array 16. Similarly, the decoder 22 has a number of outputs which are connected to respective row lines $R_1, R_2 \ldots R_M$ of the array. Although not shown in FIG. 1, the timing circuit 14 is electrically connected to the register 18 and to the decoders 22 and 24. The decoders themselves each include means, such as shift registers, for sequentially selecting the memory sub-cells in response to timing pulses from the timing circuit.

In response to timing signals produced by the timing circuit 14:

register 18 and decoder 22 sequentially select row and column lines to direct data from the register to the memory cells associated with selected mirror cells;

decoder 22 also sequentially selects the memory sub-cells into which data from the register 18 is to be written; and decoder 24 sequentially reads the data from the memory sub-cells to activate the associated mirror cells.

FIG. 2 shows schematically an arbitrary three-bit memory cell of the DMD array 16, electrically connected to row line $R_m$ and column line $C_n$. This figure also shows integrated circuitry associated with this memory cell, the mirror cell $DM_{mn}$ located at the crossing of row line $R_m$ and column line $C_n$, with which the memory cell is associated, and connections to the register 18 and to the decoders 22 and 24.

This and each other memory cell in the array is formed by three single-bit inverting memory sub-cells 54, 55, 56 for storing respective bits of a three-bit binary display code. The data to be written into this memory cell is provided over column line $C_n$ from a respective output of register 18 to three electrically connected data lines 46, 47, 48 which, in turn, are selectively connected to inputs of the sub-cells through WRITE switching transistors 36, 37, 38, respectively. Selection of these transistors is controlled via row line $R_m$ which is formed by a group of three row conductors that are electrically connected to gates of the transistors 36, 37, 38 via gating lines 32, 31, 30 respectively. Note that column line $C_n$ is electrically connected to the data lines 46, 47, 48 of every memory cell in column n. Similarly, row line $R_m$ is electrically connected to the gating lines 32, 31, 30 of every memory cell in row m.

Reading of the stored data from the memory sub-cells is controlled by the decoder 24 having three outputs which are electrically connected via gating lines 84, 85, 86 to respective gates of three READ switching transistors 68, 69, 70. Outputs of the memory sub-cells are selectively connected via these transistors to an input 72 of a single-bit inverting memory cell 74. Note that gating lines 84, 85, 86 are electrically connected to corresponding READ switching transistors for every memory cell in the array.

The single-bit inverting memory cell 74 has an output electrically connected to the associated mirror cell $DM_{mn}$. Specifically, the output of memory cell 74 is directly electrically connected to a control electrode 128 and is electrically connected through an inverter 129 to a control electrode 130. As is explained in detail in the SPIE article by Hornbeck and in U.S. Pat. No. 5,079,544, which have been incorporated by reference, when memory cell 74 produces a voltage representative of a logical ONE, this voltage effects deflection of reflective mirror element 116 to an ON position represented by the dashed line 118. Conversely, when memory cell 74 produces a voltage representative of a logical ZERO, this voltage effects deflection of reflective mirror element 116 to an OFF position represented by the dashed line 134. In the ON position, the mirror element 116 reflects light (from a source not shown in FIG. 2) and directs it toward a pixel at row m and column n on a display screen, which corresponds with the pixel represented by the memory cell. Conversely, in the OFF position, mirror element 116 directs the light away from the display screen.

FIG. 3 illustrates an example of a way in which different luminance levels are achieved for each pixel, while using the simple ON and OFF approach described above. This figure illustrates the successive illumination of an arbitrary pixel on the display screen via the corresponding deformable mirror over six successive image frame periods of duration T. Each frame period is divided into four sub-periods. During the successive periods, the mirror is deflected to achieve a variety of different luminance levels as follows:

During sub-periods $T_1-T_4$, the mirror is in its OFF position, directs the light from the source of illumination away from the display screen, and effects the production of a dark pixel.

During sub-periods $T_5-T_8$, the mirror is in its ON position, directs the light toward the corresponding pixel on the display screen, and illuminates the pixel to its brightest (100%) state.

During sub-periods $T_9-T_{12}$, the mirror is in its OFF position for half of the frame period and is in its ON position for the remaining half of the frame period. The viewer, looking at this pixel, time averages this off and on illumination and interprets or sees the pixel at approximately 50% of its brightest state.

During sub-periods $T_{13}-T_{16}$, the mirror is in its OFF position for one quarter of the frame period and is in its ON position for the remaining three quarters of the frame period. The viewer, looking at this pixel, time averages this off and on illumination and sees the pixel at approximately 75% of its brightest state.

The remaining sub-periods ($T_{17}-T_{20}$ and $T_{21}-T_{24}$) illustrate operation of the mirror for the same relative on and off durations as in sub-periods $T_{13}-T_{16}$ and $T_9-T_{12}$, respectively, but in the opposite on-off sequence.

In order to achieve different luminance levels for each pixel in the manner just described, time-weighted display codes are stored in the corresponding memory cell. For example, to achieve the mirror-deflection timing illustrated in FIG. 3, a simple three-bit binary code may be utilized, with each higher order bit having twice the weight of the last. As is well known in the art, with this type of weighting eight different values can be represented by a three-bit binary display code. For the four different luminance levels represented in FIG. 3, the binary codes would be "000" (dark), "100" (50% brightness), "110" (75% brightness), and "111" (100% brightness).

Operation of the circuitry of FIG. 2, utilizing such codes to effect time-weighted deflection of the mirror element 116 will now be explained. Just prior to each of the frame periods shown in FIG. 3, the three memory sub-cells 54, 55, 56 are loaded with the respective bits of the appropriate display code. The three bits of each code are sequentially transmitted over column line $C_n$ while timing pulses are sequentially transmitted over the three row conductors of row line $R_m$ to the respective gating lines 32, 31, 30 to write the code bits into the memory sub-cells. For purposes of this example, the least significant bit (LSB), next most significant bit, and most significant bit (MSB) are stored in respective memory sub-cells 56, 55 and 54. The decoder 24 then effects reading of the three bits by successively applying time-weighted pulses to the gating lines 84, 85, 86 to cause successive transfer of the bits into the single-bit memory cell 74. The logical values of these bits (i.e. ONE or ZERO), during their storage in memory cell 74, effect corresponding deflections of the mirror element 116.

In practical operation of the disclosed embodiment of FIG. 2, the mirror element cannot be activated 100% of a frame time. Rather, a small part of each frame time T must be devoted to writing the codes into the memory sub-cells. Utilizing the four millisecond frame period set forth as an example in U.S. Pat. No. 5,079,544, one-half millisecond could be devoted to writing the display codes into the respective pixel memory cells, leaving 3.5 milliseconds for deflecting the mirror elements. The time-weighted pulses applied by decoder 24 to gating lines 84, 85, and 86 would then have durations of two milliseconds, one millisecond, and one-half millisecond, respectively. In this example, the eight different binary codes obtainable with three bits would effect ON times for the mirror element 116 as listed in the following table:

TABLE I

| Code | ON Time | % of Frame Time |
| --- | --- | --- |
| "000" | 0 ms. | 0 percent |
| "001" | 0.5 ms. | 12.5 percent |
| "010" | 1.0 ms. | 25 percent |
| "011" | 1.5 ms. | 37.5 percent |
| "100" | 2.0 ms. | 50 percent |
| "101" | 2.5 ms. | 62.5 percent |
| "110" | 3.0 ms. | 75 percent |
| "111" | 3.5 ms. | 87.5 percent |

Generally, operation of DMD display apparatus in accordance with the method illustrated in FIG. 3 is satisfactory. An improved version of that method employs longer display codes (e.g. seven-bit codes which are stored in seven-bit memory cells) to provide a greater variety of luminance levels. While this improves the quality of images displayed by the apparatus, it does not correct a disturbing artifact which occurs whenever the eyes of the viewer scan across the image, e.g. to follow a moving object. In this situation, the viewer's visual system incorrectly quantifies the luminance values of certain pixels which are momentarily viewed by the human eye. In other words, the brightness of these pixels seen by the human visual system is in error.

SUMMARY OF THE INVENTION

It is an object of the invention to eliminate this artifact from images presented by arrays of digital light modulating elements.

It is another object of the invention to eliminate the artifact without requiring substantial modification of the display apparatus incorporating the digital light modulating elements.

Achievement of these and other objects of the invention is based on the determination that the artifact seen by the viewer relates to a limitation of the human visual system. Specifically, when the method illustrated in FIG. 3 is employed, and the eye scans rapidly across certain displayed pixels, the human visual system is unable to correctly average the ON/OFF lighting times effected by the digital light modulating elements for the respective pixels. It is believed that this occurs because, as the eye scans, it views each pixel only during a portion of a frame period. If that portion is not long enough to receive proportionate samples of the ON/OFF lighting times for any pixel scanned, the perceived brightness of the pixel will be in error. For example, if the eye views the pixel represented by FIG. 3 during only sub-period $T_{22}$, the viewer will incorrectly see the pixel at 100% brightness. Alternatively, if the eye views the same pixel during the last half of sub-period $T_{22}$ and the first half of sub-period $T_{23}$, the viewer will correctly see the pixel at 50% brightness. Conversely, the eye will correctly perceive the brightness of the pixel regardless of when it is viewed during either the first ($T_1-T_4$) or second ($T_5-T_8$) frame period.

In accordance with the invention a distributed duty cycle approach is utilized for the activation of the digital light modulating elements. As in the known approach, each bit of a display code has a value representing either a first state, such as an ON position of a DMD mirror, or a second state, such as an OFF position of a DMD mirror. Also, each bit of the code has a respective weight corresponding to a duration that is equal to a predefined percentage of the frame period. However, rather than activating each digital light modulating element continuously, for the respective durations corresponding to the weights of the bits, the activation of the element into the state represented by a first bit, having a weight which is substantially greater than that of a second bit, is interrupted at least once while the element is activated into the state represented by a different one of the bits in the code.

In a first preferred form of the invention, each display code comprises a group of bits having respective values representing either an ON state or an OFF state, and a sub-group of the bits has a collective weight corresponding to a collective activation duration which is greater than one-half of the frame period. While activating the associated digital light modulating element into the states represented by the bits in the group, for the respective activation durations corresponding to the weights of the bits, the element is repeatedly sequentially activated into the states represented by the bits in the sub-group to cumulatively achieve the collective activation duration.

In a second preferred form of the invention, each display code also comprises a group of bits having respective values representing either an ON state or an OFF state. One of the bits has a weight corresponding to a minimum duration which is no greater than the weight of any of the other bits in the group. A sub-group of the bits each has a respective weight corresponding to a duration which is at least twice the minimum duration and collectively have a weight corresponding to a collective duration. While activating the associated digital light modulating element into the states represented by the bits in the group, for the respective activation durations corresponding to the weights of the bits, the element is repeatedly sequentially activated into the states represented by the bits in the sub-group for respective periods which are at least equal to the minimum duration to cumulatively achieve the collective activation duration.

In a third preferred form of the invention, in which each display code comprises a group of bits having respective values representing either an ON or an OFF state, the group comprises first and second sub-groups of bits. In the first sub-group, one of the bits has a weight corresponding to a minimum duration which is no greater than the weight of any of the other bits in this sub-group. In the second sub-group, each of the bits has a weight corresponding to a duration which is at least twice the minimum duration, and the bits in this sub-group have a collective weight corresponding to a collective activation duration. While activating the associated digital light modulating element into the states represented by the bits of the associated code, the element is repeatedly sequentially activated into the states represented by the bits in the second sub-group for respective periods which are at least equal to the minimum duration to cumulatively achieve the collective activation duration.

BRIEF DESCRIPTION OF THE DRAWING

FIG. 4 is a timing diagram showing a prior art method of duty-cycle modulating cells in the deformable mirror device of FIG. 1, using a seven-bit display code.

FIG. 5 is a timing diagram showing distributed duty-cycle modulation in accordance with an embodiment of the invention, using a seven-bit display code.

DESCRIPTION OF THE PREFERRED EMBODIMENTS

Figure 1:
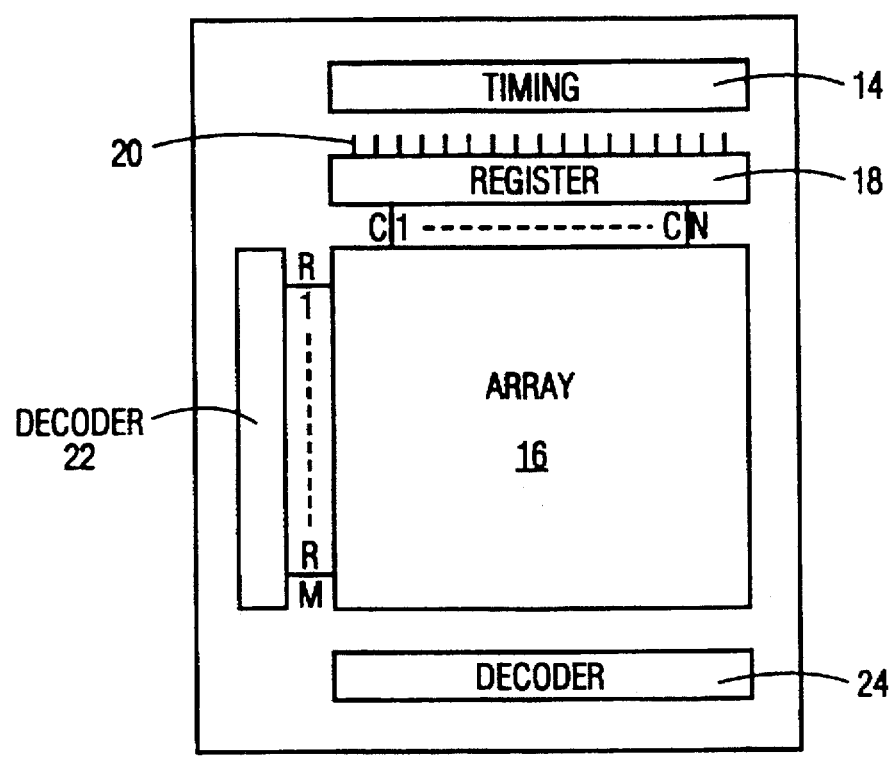
FIG. 1 is a diagram of a known deformable mirror device constructed on a single substrate.
Figure 2:
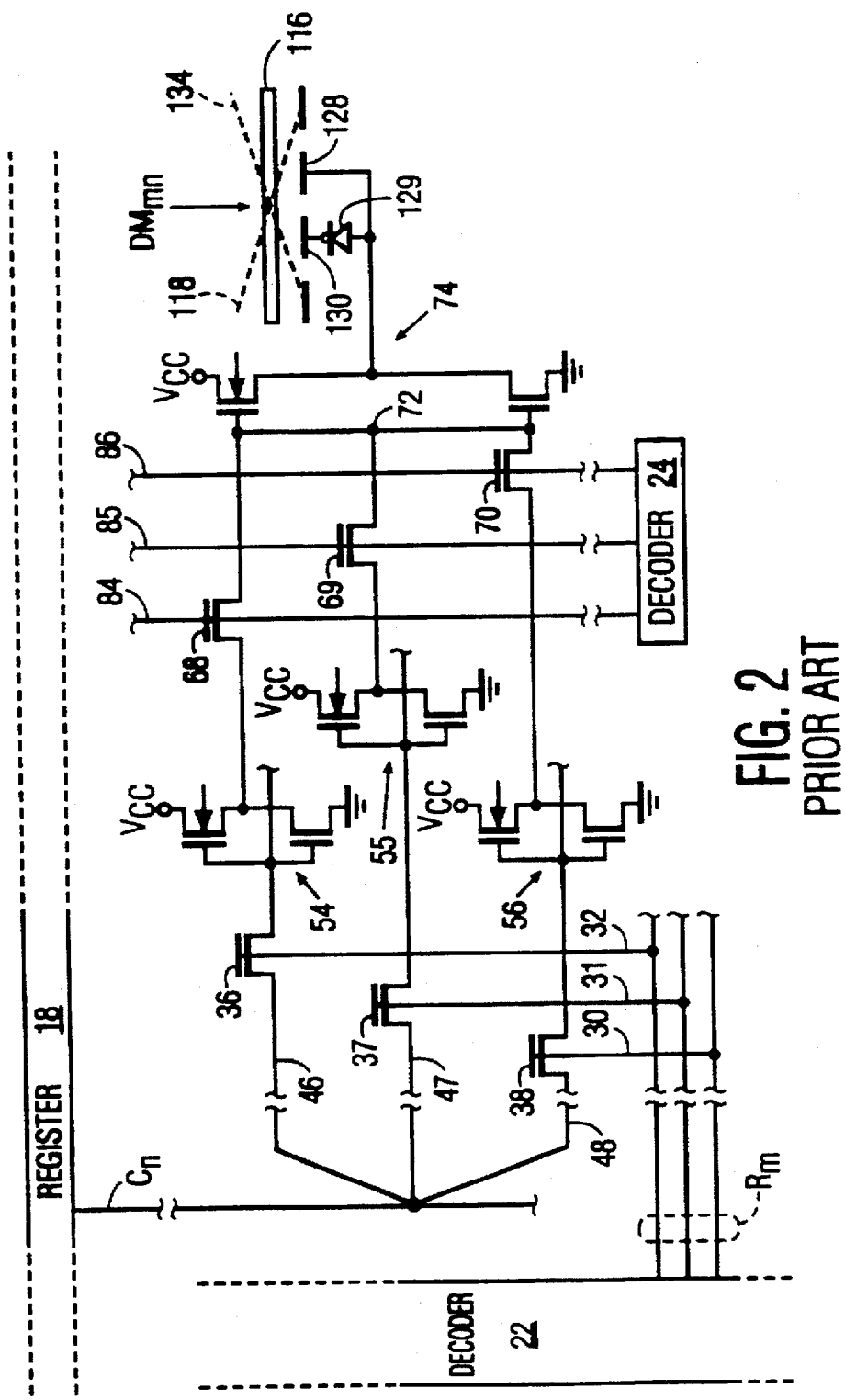
FIG. 2 is a schematic diagram of a single cell of the device of FIG. 1.
Figure 3:
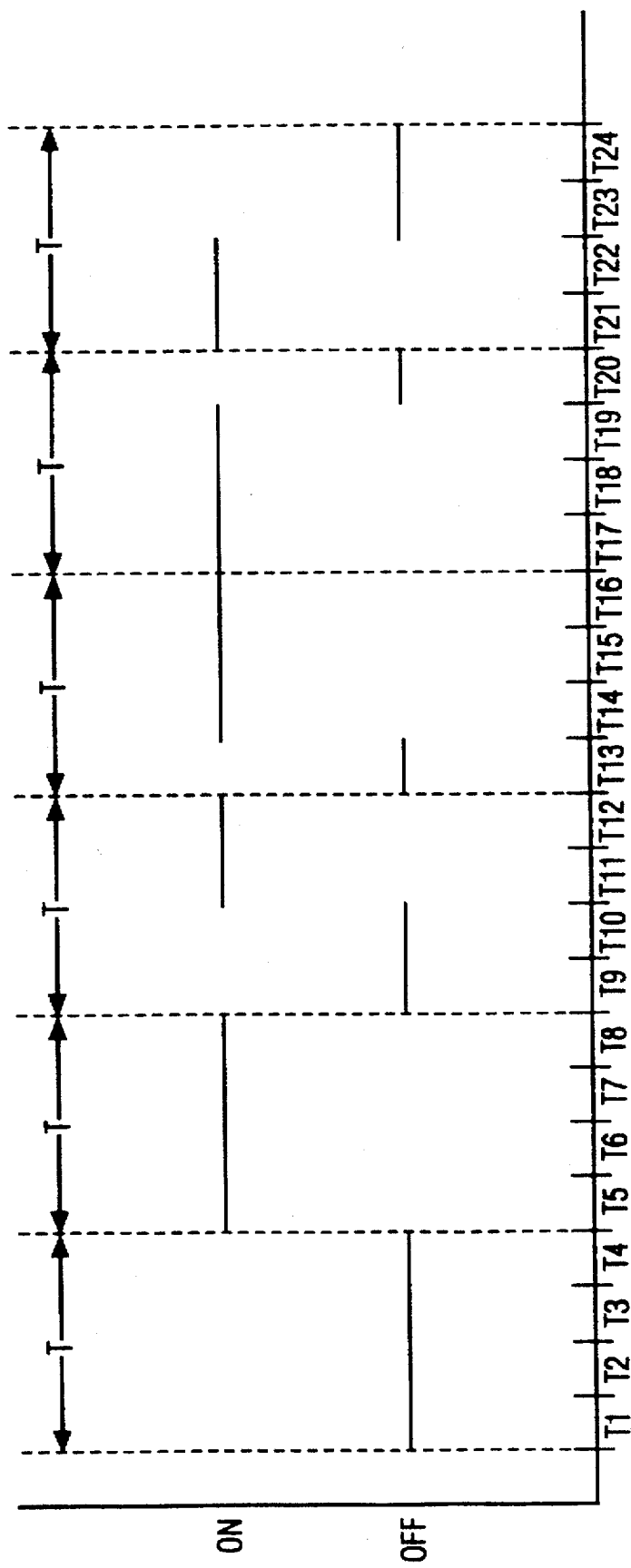
FIG. 3 is a generalized timing diagram showing a prior art method of duty-cycle modulating cells in the deformable mirror device of FIG. 1.

FIGS. 4 and 5 illustrate two exemplary methods of operation of a DMD having a seven-bit memory cell associated with each mirror cell. Specifically, FIG. 4 illustrates operation in accordance with the prior art method described in the Background of the Invention, while FIG. 5 illustrates operation in accordance with a first embodiment of the invention.

In each of these examples, a binary display code 1001101 is read from the memory cell during a READ portion of the respective frame period and then a new seven-bit display code is written into the memory cell during a WRITE portion of the same frame period. In a typical application, such as displaying television images at 60 Hz., each frame period T would have a duration of approximately 16.7 ms for presenting a monochromatic image or approximately 5.6 ms for presenting each of three successive red-green-blue (RGB) images to produce a composite polychromatic image. In the illustrated examples of FIGS. 4 and 5, the READ and WRITE portions of the frame period for a monochromatic image occupy approximately 12.7 and 4.0 ms, respectively. For a composite polychromatic image, each of the RGB images would be produced in a respective frame period having READ and WRITE portions of 4.2 and 1.3 ms, respectively. Of course, the READ and WRITE portions could occupy different portions of the frame period, depending on the particular display apparatus. Alternatively, if two multi-bit memory cells are provided for each mirror cell, the READ and WRITE cycles could occur simultaneously, with the READ cycle occupying the entire frame period.

For purposes of these examples, each higher order bit of the display code has a value corresponding to twice that of the last, with the least significant bit $B_0$ having a weight corresponding to a duration of either 0.1 ms for a monochromatic frame period or 0.0333 ms for a polychromatic frame period. In either case, the exemplary 1001101 display code would activate the associated mirror into its ON state for approximately 61% of the READ portion of the frame period. This is also 61% of the maximum brightness obtainable, which occurs when the mirror is in its ON state for 100% of the READ portion.

As is readily apparent from FIG. 4, even when utilizing a seven bit display code, the prior art method suffers from the same disadvantage as in the previously described example utilizing a three bit code. That is, by sequentially activating the mirror for the full durations represented by the respective bits, i.e. bits $B_6B_5B_4B_3B_2B_1B_0$ the artifact is likely to appear. For example, if the eye views the pixel corresponding to the mirror during only activation of the mirror into the ONE state represented by the most significant bit $B_6$, the viewer will incorrectly interpret or see the pixel at 100% brightness. Alternatively, if the eye views the pixel during activation of the mirror into the ZERO state represented by the next-most-significant bits $B_5$ and $B_4$, the viewer will incorrectly see the pixel as dark (zero brightness).

FIG. 5 illustrates how this artifact is avoided by activating the mirror in accordance with a first embodiment of the invention. That is, activation of the mirror into the state represented by most significant bit $B_6$ is interrupted while the mirror is activated into the states represented by the bits $B_5$ and $B_4$. For the monochromatic example, the mirror is sequentially activated into the states represented by the bits $B_6B_3B_4$ for respective periods of 0.4 ms, 0.2 ms and 0.1 ms, and this sequence is repeated until it occurs sixteen times to cumulatively achieve the full activation duration of 11.2 ms for these three bits. In other words, each of these three bit durations is separated into sixteen periods which are uniformly distributed throughout the cumulative 11.2 ms duration for the three bits. By thus distributing the mirror activation for the three most significant bits over 87.5% of the entire mirror activation duration, the viewer is likely to see the pixel at an approximately correct brightness level. That is, if the eye views the pixel for any 0.7 ms or longer portion of the 11.2 ms activation duration for the most significant bits $B_6B_5B_4$, the viewer will see an approximately correct brightness. For the particular example of the 1001101 display code, the brightness seen after viewing the pixel for any 0.7 ms portion of the 11.2 ms duration will be 60% rather than the correct brightness of 61%. However, if the eye views the pixel during the 1.5 ms interval when the mirror is activated into the states represented by bits $B_3B_2B_1B_0$, the viewer will see a brightness which depends on the values of these four least significant bits. Such a value is less likely than that of the most significant bits to approximate the correct brightness represented by the full seven-bit code.

Figure 6:
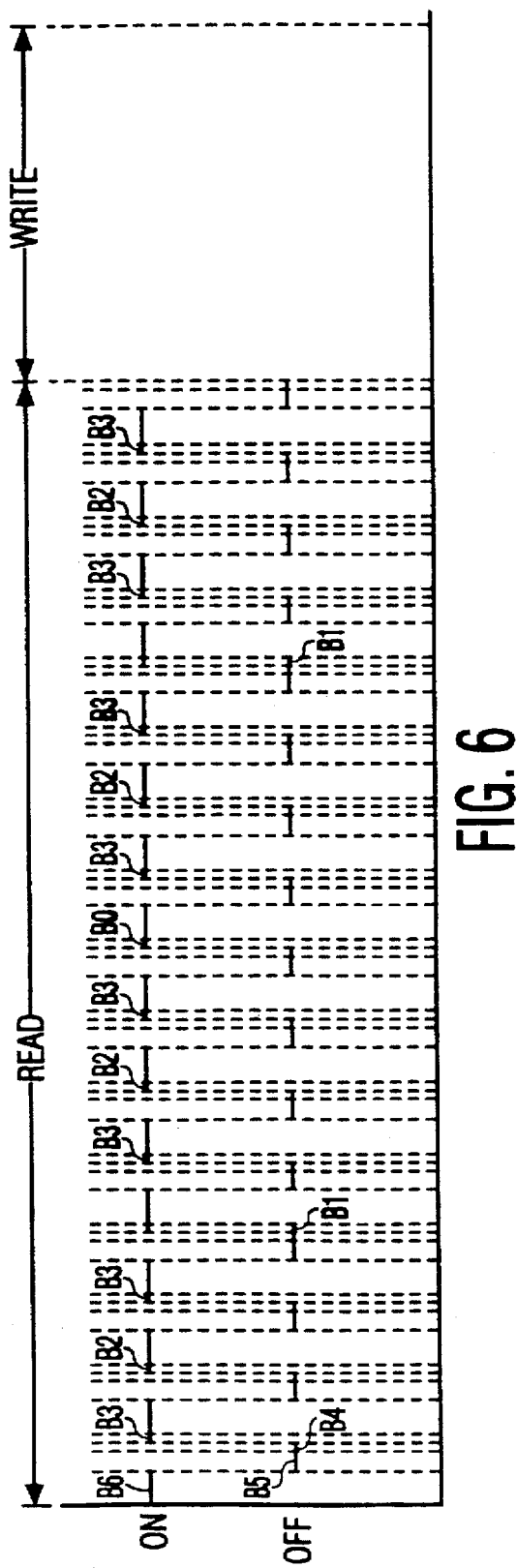
FIG. 6 is a timing diagram showing distributed duty-cycle modulation in accordance with another embodiment of the invention, using a seven-bit display code.

FIG. 6 illustrates an embodiment of the invention which produces an accurate brightness interpretation regardless of when the eye views the pixel. This is achieved by separating each of the six most-significant-bit durations into multiple mirror-activation periods and by distributing these periods and the mirror-activation duration for the least significant bit $B_0$ uniformly throughout the READ portion of the frame period. In the example of FIG. 6, the same binary-weighted display code and READ and WRITE durations are used to facilitate comparison with FIGS. 4 and 5.

As in the FIG. 5 embodiment, the mirror is sequentially activated into the states represented by the bits $B_6B_5B_4$ and this sequence is repeated until it occurs sixteen times. However, the sixteen $B_6B_5B_4$ sequences are now distributed throughout the entire mirror activation duration, corresponding to the READ portion of the frame period. For the monochromatic example, the mirror is sequentially activated into the states represented by the bits $B_6B_5B_4$ for the respective periods of 0.4 ms, 0.2 ms and 0.1 ms, and the sixteen occurrences of this sequence again utilize 11.2 ms of the complete 12.7 ms mirror activation duration. To simplify FIG. 6, only the first occurrence of this $B_6B_5B_4$ sequence is labelled.

With respect to the remaining bits, the mirror activation durations for more-significant bits $B_3$, $B_2$, and $B_1$ are each separated into multiple mirror-activation periods, and these periods and the mirror-activation duration for the least significant bit $B_0$ are inserted between the $B_6B_5B_4$ sequences. For the monochromatic example, each of these periods is 0.1 ms long, which is equal to the $B_0$ duration.

The pattern in which these periods are distributed between the $B_6B_5B_4$ sequences can be determined from FIG. 6, but is more readily apparent from the following table:

TABLE II

| | | | | | | | | | | | | | | | | |
|---|---|---|---|---|---|---|---|---|---|---|---|---|---|---|---|---|
| $B_6$ | | | | | | | | | | | | | | | | |
| $B_5$ | X | X | X | X | X | X | X | X | X | X | X | X | X | X | X | X |
| $B_4$ | | | | | | | | | | | | | | | | |
| $B_3$ | X | | X | | X | | X | | X | | X | | X | | X | |
| $B_2$ | | X | | | X | | | X | | | X | | | X | | |
| $B_1$ | | | | X | | | | | | X | | | | | | |
| $B_0$ | | | | | | | | X | | | | | | | | |

From this table it is apparent that the eight mirror-activation periods for bit $B_3$ are uniformly inserted between the sixteen $B_6B_5B_4$ sequences, the four mirror-activation periods for bit $B_2$ are uniformly inserted between the $B_3$ periods, the two mirror-activation periods for bit $B_1$ are uniformly inserted between the $B_2$ periods, and the single mirror-activation period for bit $B_0$ is inserted midway between the two $B_1$ periods.

Note that, although the described embodiments utilize uniform distribution patterns, the invention is not limited to such patterns. Rather, the distribution patterns may be adapted to the type of imagery with which the invention is used and may be, for example, random or some other type of nonuniform distribution. Alternatively, the pattern could be optimized to reduce the number of times which the mirrors must be switched from one state to the other during each frame period, thereby prolonging mirror life.

We claim:

1. A method of operating a display apparatus comprising a light source, a screen for displaying successive images during respective frame periods, an array of digital light modulating elements interposed in an optical path between the light source and the screen, and means for activating each of the digital light modulating elements into either a first state, in which said element enables the light to illuminate a corresponding pixel of an image area of the display screen, or a second state, in which said element impedes the light from illuminating said pixel, said method comprising, for each of said frame periods:

a. storing, in association with each of the digital light modulating elements, a multi-bit code representing the luminance of the corresponding pixel during said frame period, each bit having a value representing either the first state or the second state and having a respective weight corresponding to a duration equal to a predefined percentage of the frame period during which the associated digital light modulating element is to be in the state represented by said value, a first one of said bits having a weight which is substantially greater than the weight of a second one of said bits; and b. activating each digital light modulating element, into the states represented by the bits of the associated code, for the respective durations corresponding to the weights of said bits, said activation of said element into the first state represented by the first bit being interrupted at least once while said element is activated into the second state represented by a different one of the bits in the code, wherein the first and second states collectively represent the luminance of the corresponding pixel.

2. A method of operating a display apparatus comprising a light source, a screen for displaying successive images during respective frame periods, an array of digital light modulating elements interposed in an optical path between the light source and the screen, and means for activating each of the digital light modulating elements into either an ON state, in which said element enables the light to illuminate a corresponding pixel of an image area of the display screen, or an OFF state, in which said element impedes the light from illuminating said pixel, said method comprising, for each of said frame periods:

a. storing, in association with each of the digital light modulating elements, a group of bits forming a binary code representing the luminance of the corresponding pixel during said frame period, each bit having a value representing either the ON state or the OFF state and having a respective weight corresponding to an activation duration equal to a predefined percentage of the frame period during which the associated digital light modulating element is to be in the state represented by said value, a sub-group of said bits having a collective weight corresponding to a collective activation duration which is greater than one-half of the frame period; and b. activating each digital light modulating element, into the states represented by the bits of the associated code, for the respective activation durations corresponding to the weights of said bits, said element being repeatedly sequentially activated into the states represented by the bits in the sub-group to cumulatively achieve the collective activation duration.

3. A method of operating a display apparatus comprising a light source, a screen for displaying successive images during respective frame periods, an array of digital light modulating elements interposed in an optical path between the light source and the screen, and means for activating each of the digital light modulating elements into either an ON state, in which said element enables the light to illuminate a corresponding pixel of an image area of the display screen, or an OFF state, in which said element impedes the light from illuminating said pixel, said method comprising, for each of said frame periods:

a. storing, in association with each of the digital light modulating elements, a group of bits forming a binary code representing the luminance of the corresponding pixel during said frame period, each bit having a value representing either the ON state or the OFF state and having a respective weight corresponding to an activation duration equal to a predefined percentage of the frame period during which the associated digital light modulating element is to be in the state represented by said value, one of said bits having a weight corresponding to a minimum duration which is no greater than the weight of any of the other bits in the group and a sub-group of said bits each having a respective weight corresponding to a duration which is at least twice said minimum duration and having a collective weight corresponding to a collective activation duration; and b. activating each digital light modulating element, into the states represented by the bits of the associated code, for the respective activation durations corresponding to the weights of said bits, said element being repeatedly sequentially activated into the states represented by the bits in the sub-group for respective periods which are at least equal to the minimum duration to cumulatively achieve the collective activation duration.

4. The method as in claim 3, wherein the sub-group includes a lesser significant bit having a first weight and includes a plurality of more significant bits having respective weights which are multiples of the first weight and wherein, during each of said repeated sequential activations of the digital light modulating element into the states represented by the bits in said sub-group, said element is activated into the states represented by the more significant bits for respective periods which are multiples of the period of activation of said lesser significant bit.

5. The method as in claim 4, wherein during each of said repeated sequential activations of the digital light modulating element into the states represented by the bits in said sub-group, said element is activated into the state represented by the lesser significant bit for a period equal to said minimum duration.

6. The method as in claim 4, wherein said element is activated into the states represented by the more significant bits for respective periods which are whole number multiples of the period of activation of said lesser significant bit.

7. A method of operating a display apparatus comprising a light source, a screen for displaying successive images during respective frame periods, an array of digital light modulating elements interposed in an optical path between the light source and the screen, and means for activating each of the digital light modulating elements into either an ON state, in which said element enables the light to illuminate a corresponding pixel of an image area of the display screen, or an OFF state, in which said element impedes the light from illuminating said pixel, said method comprising, for each of said frame periods:

a. storing, in association with each of the digital light modulating elements, a group of bits forming a binary code representing the luminance of the corresponding pixel during said frame period, each bit having a value representing either the ON state or the OFF state and having a respective weight corresponding to an activation duration equal to a predefined percentage of the frame period during which the associated digital light modulating element is to be in the state represented by said value, said group comprising:

i. a first sub-group of bits, each having a respective weight, one of said bits having a weight corresponding to a minimum duration which is no greater than the weight of any of the other bits in said first sub-group;

ii. a second sub-group of bits, each having a respective weight corresponding to a duration which is at least twice said minimum duration and having a collective weight corresponding to a collective activation duration;

b. activating each digital light modulating element, into the states represented by the bits of the associated code, for the respective activation durations corresponding to the weights of said bits, said element being repeatedly sequentially activated into the states represented by the bits in the second sub-group for respective periods which are at least equal to the minimum duration to cumulatively achieve the collective activation duration.

8. The method as in claim 7, wherein each of the bits in the second sub-group has a respective weight which is at least twice the weight of each bit in the first sub-group.

9. The method as in claim 7, wherein the first sub-group includes at least one more significant bit having a respective weight corresponding to at least twice the minimum duration and wherein the respective digital light modulating element is repeatedly sequentially activated into the state represented by said more significant bit.

10. The method as in claim 9, wherein periods during which each digital light modulating element is activated into the state represented by the at least one more significant bit in the first sub-group are distributed among periods during which said element is activated into the states represented by the bits in the second sub-group.

11. The method as in claim 10, wherein periods during which each digital light modulating element is activated into the state represented by the at least one more significant bit in the first sub-group are evenly distributed among periods during which said element is activated into the states represented by the bits in the second sub-group.

12. A method of operating a display apparatus comprising a light source, a screen for displaying successive images during respective frame periods, an array of digital light modulating elements interposed in an optical path between the light source and the screen, and means for activating each of the digital light modulating elements into either an ON state, in which said element enables the light to illuminate a corresponding pixel of an image area of the display screen, or an OFF state, in which said element impedes the light from illuminating said pixel, said method comprising, for each of said frame periods:

a. storing, in association with each of the digital light modulating elements, a group of bits forming a binary code representing the luminance of the corresponding pixel during said frame period, each bit having a value representing either the ON state or the OFF state and having a respective weight corresponding to an activation duration equal to a predefined percentage of the frame period during which the associated digital light modulating element is to be in the state represented by said value, said group of bits including:

i. a least-significant bit having a weight corresponding to a minimum duration which is smaller than the weight of any of the other bits in the group;

ii. a first sub-group of more-significant bits, each having a respective weight corresponding to a duration which is at least twice said minimum duration and having a collective weight corresponding to a first collective activation duration; and iii. a second sub-group of most significant bits, each having a respective weight corresponding to a duration which is greater than that of any of the bits in the first sub-group and having a second collective activation duration; and b. activating each digital light modulating element, into the states represented by the bits of the associated binary code, for the respective activation durations corresponding to the weights of said bits, said element:

i. being once activated for the minimum duration into the state represented by the least significant bit;

ii. being repeatedly sequentially activated into the states represented by the bits in the second sub-group to cumulatively achieve the second collective activation duration; and iii. in time periods between said repeated sequential activations, said element being activated for respective time periods into the states represented by individual ones of the bits in the first sub-group to cumulatively achieve the first collective activation duration.

13. The method as in claim 12, wherein each of the respective time periods are substantially equal to the minimum duration.

14. The method as in claim 12, wherein the respective time periods are substantially evenly distributed in the time periods between the repeated sequential activations.

15. The method as in claim 1, 2, 3, 7 or 12 wherein the digital light modulating elements comprise deformable mirrors.

16. A method of operating a display apparatus including a light source, a screen for displaying successive images during respective frame periods, an array of digital light modulating elements interposed in an optical path between the light source and the screen, and circuitry which switches each of the digital light modulating elements into first and second states whereby light illuminates a corresponding pixel of an image area of the display screen or impedes the light from illuminating the pixel, respectively, said method comprising, for each of the frame periods:

a. storing, in association with each of the digital light modulating elements, a multi-bit code representing overall luminance of the corresponding pixel during a frame period, each bit having a value corresponding to one of said first and second states and having a respective weight corresponding to a duration equal to a predefined percentage of the frame period during which the associated digital light modulating element is to be in the state corresponding to said value, a first one of said bits having a weight which is substantially greater than the weight of a second one of said bits; and b. repeatedly switching each digital light modulating element between said first and second states responsive to the bits of the associated code during a plurality of sub-periods of the frame period to generate a corresponding plurality of luminance sequences, at least one of which substantially represents the overall luminance of the corresponding pixel.

17. The method as in claim 16, wherein substantially all of the bits corresponding to the first state and substantially all of the bits corresponding to the second state are represented in said luminance sequences during the majority of said sub-periods.

18. The method as in claim 16, wherein the digital light modulating elements comprise liquid crystal cells.

* * * * *